United States Patent
Einola et al.

(10) Patent No.: US 6,741,860 B1
(45) Date of Patent: May 25, 2004

(54) SIGNALLING METHOD

(75) Inventors: Heikki Einola, Espoo (FI); Tony Hulkkonen, Helsinki (FI); Jaakko Rajaniemi, Helsinki (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/830,781
(22) PCT Filed: Nov. 5, 1999
(86) PCT No.: PCT/FI99/00923
§ 371 (c)(1),
(2), (4) Date: Aug. 23, 2001
(87) PCT Pub. No.: WO00/28751
PCT Pub. Date: May 18, 2000

(30) Foreign Application Priority Data

Nov. 6, 1998 (FI) .................................................. 982418

(51) Int. Cl.[7] .................................................. H04Q 7/20
(52) U.S. Cl. ..................... 455/450; 455/426.1; 455/560
(58) Field of Search ................................. 455/450, 451, 455/452.1, 453, 455, 560, 426.1, 422.1, 433

(56) References Cited

U.S. PATENT DOCUMENTS

| 5,629,974 | A |   | 5/1997 | Rajala et al. ............... 379/58 |
| 5,708,697 | A |   | 1/1998 | Fischer et al. ............. 379/67 |
| 6,088,343 | A | * | 7/2000 | King ........................ 370/329 |
| 6,259,925 | B1 | * | 7/2001 | Josse ....................... 455/466 |

FOREIGN PATENT DOCUMENTS

| EP | 0735789 A2 | 10/1996 | ............ H04Q/7/24 |
| WO | WO 98/37721 | 8/1998 | ............ H04Q/7/38 |

* cited by examiner

Primary Examiner—Duc M. Nguyen
Assistant Examiner—Huy Phan
(74) Attorney, Agent, or Firm—Cohen, Pontani, Lieberman & Pavane

(57) ABSTRACT

The invention concerns control of connections in cellular telecommunication systems, particularly setting up and releasing of connections. According to the invention, during setting up of a new MM connection it is checked whether an RRC connection is already active. If an RRC connection is already active, explicit signalling is used. Otherwise, RRC level events can be used to implicity control MM level events. During releasing of MM connections, it is checked if another MM protocol uses RRC connections, and if that is the case, the releasing of MM connections is signalled explicitly.

6 Claims, 4 Drawing Sheets

SIGNALLING METHOD

PRIORITY CLAIM

This is a national stage of PCT application No. PCT/FI99/00923, filed on Nov. 5, 1999. Priority is claimed on that application, and on patent application No. 982418 filed in Finland on Nov. 5, 1998.

TECHNICAL FIELD OF THE INVENTION

The invention concerns control of connections in cellular telecommunication systems, particularly setting up and releasing of connections.

BACKGROUND OF THE INVENTION

For clarification of common terms used in this document, an overview of certain cellular telecommunication system configurations is presented in the following.

Proposals for third-generation systems include UMTS (Universal Mobile Telecommunications System) and FPLMTS/IMT-2000 (Future Public Land Mobile Telecommunications System/International Mobile Telecommunications at 2000 MHz). In these plans cells are categorised according to their size and characteristics into pico-, nano-, micro- and macrocells, and an example of the service level is the bit rate. The bit rate is the highest in picocells and the lowest in macrocells. The cells may overlap partially or completely and there may be different terminals so that not all terminals necessarily are able to utilise all the service levels offered by the cells.

FIG. 1 shows a version of a future cellular radio system which is not entirely new compared with the known GSM system but which includes both known elements and completely new elements. In current cellular radio systems the bottleneck that prevents more advanced services from being offered to the terminals comprises the radio access network RAN which includes the base stations and base station controllers. The core network of a cellular radio system comprises mobile services switching centres (MSC), other network elements (in GSM, e.g. SGSN and GGSN, i.e. Serving GPRS Support Node and Gateway GPRS Support node, where GPRS stands for General Packet Radio Service) and the related transmission systems. According e.g. to the GSM+ specifications developed from GSM the core network can also provide new services.

In FIG. 1, the core network of a cellular radio system 20 comprises a core network CN 931 which has three parallel radio access networks linked to it. Of those, networks 932 and 933 are UMTS radio access networks and network 934 is a GSM radio access network. The upper UMTS radio access network 932 is e.g. a commercial radio access network, owned by a telecommunications operator offering mobile services, which equally serves all subscribers of said telecommunications operator. The lower UMTS radio access network 933 is e.g. private and owned e.g. by a company in whose premises said radio access network operates. Typically the cells of the private radio access network 933 are nano- and/or picocells in which only terminals of the employees of said company can operate. All three radio access networks may have cells of different sizes offering different types of services. Additionally, cells of all three radio access networks 932, 933 and 934 may overlap either entirely or in part. The bit rate used at a given moment of time depends, among other things, on the radio path conditions, characteristics of the services used, regional overall capacity of the cellular system and the capacity needs of other users. The new types of radio access networks mentioned above are called UMTS terrestrial radio access networks (UTRAN). Such a network can co-operate with different types of fixed core networks CN and especially with the GPRS network of the GSM system. The UMTS terrestrial radio access network (UTRAN) can be defined as a set of base stations (BS) and radio network controllers (RNC) that are capable of communicating with each other using signalling messages.

The terminal 10 shown in FIG. 1 is preferably a so-called dual-mode terminal that can serve either as a second-generation GSM terminal or as a third-generation UMTS terminal according to what kind of services are available at each particular location and what the user's communication needs are. It may also be a multimode terminal that can function as terminal of several different communications systems according to need and the services available. Radio access networks and services available to the user are specified in a subscriber identity module 936 (SIM) connected to the terminal.

FIG. 1 further shows some details of the structure of a radio access network. A radio access network 932, 934 typically comprises one or more base stations 937 and a controlling unit 42. In UMTS radio access networks 932, 933 the controlling unit is called the radio network controller (RNC), and in GSM networks 934 the controlling unit is called a base station controller (BSC). The radio access networks typically comprise also other network elements such as transcoder units. FIG. 1 further shows a mobile services switching centres (MSC) 43 which basically controls circuit-switched connections of mobile stations 10 and a Serving GPRS Support Node (SGSN) 41 which basically controls packet switched connections of mobile stations 10.

In cellular telecommunication systems, connections are set up and resources reserved on demand and released when not needed Moving mobile stations place additional requirements for the system, connections need to be transferred from one base station to another, which often requires a substantial change in the routing of the connection through the network. The exchanges of information between various network elements which are necessary for executing such functionality are handled by mobility management (MM) protocols and radio resource control (RRC) protocols. Mobility management protocols mainly take care of the mechanisms allowing a mobile station to move within the cellular network and security issues, while RRC protocols mainly take care of controlling the use of radio resources over the air interface, the connection between a mobile station and the BSC/RNC, and handovers. The execution of the RRC protocols is mainly performed by the mobile station and the BSC/RNC. Some parts of the RRC protocol, such as functionality related to inter-MSC handovers, are executed by the MSC. The execution of the MM protocols is mainly performed by the mobile station and the MSC. The protocols used in the GSM system are described further in the book "The GSM System for Mobile Communications" by Michel Mouly and Marie-Bernadette Pautet, ISBN 2-9507190-0-7, Palaiseau 1992. Mobility management protocols for third generation cellular networks are discussed, for example, in patent application WO 98/37721, where emphasis is set on minimizing the number of MM messages sent over radio interface in situations, where a radio access network is connected to, for example, many core networks, each having dedicated mobility management.

In principle, the MM and RRC protocols are mainly separate. However, in order to reduce signalling, many MM functions are started or finished as a result of events in the RRC level, without explicit messaging in the MM level. For example, during releasing of a connection in the present GSM system, the MM protocol changes its state from a WAIT FOR NETWORK COMMAND state to the IDLE state as a response to releasing of the radio resources in the RRC level. Therefore, the releasing of radio resources in the RRC level implicitly acts as a control signal for the MM level. However, this approach creates problems in the new cellular systems under development, such as the UMTS system. Some of these problems are described in the following with reference to FIG. 2.

FIG. 2 shows a mobile station 10 and the cellular network 20, various entities taking care of executing the protocols such as the MM protocol entity 11 and the RRC protocol entity 12 of the mobile station. At the network side, corresponding entities are the MM protocol entity 21 in the MSC and the RRC protocol entity 22 in the RNC. The MM and RRC entities are typically realized using software programs executed by a processing unit such as a microprocessor in the control unit of a MS or a network element.

Some services take care of the mobility management of their connections themselves, independently from the MSC. An example of such services is the GPRS service. Their independent mobility management results in the execution of a further MM protocol, which is separate from the MM protocol executed by the MSC. In GPRS, the SGSN executes its own MM protocol. The second MM protocol has corresponding MM protocol entities 13, 23 in the MS and in the SGSN. However, only one RRC protocol is used, since it is advantageous to have the control of all radio resources needed by the mobile station in a single protocol, and in a single controlling entity at each end of the radio connection. For example, it is advantageous to use only one ciphering mode for all transmissions of the mobile station, instead of negotiating and using one ciphering mode for connections via the MSC, and another ciphering mode for packet connections via the SGSN.

Since only one RRC protocol is used, MM level mechanisms based on implicit meanings of events in the RRC level do not work properly, when two MM protocols are used. For example, if packet transmission bearers are released while speech bearers are still active, at least some RRC connections 30 still remain in use. Since the packet connection MM entity 13 of the mobile station expects to observe the releasing of RRC connections as an indication of releasing of the MM connection 32, 34, it remains in the WAIT FOR NETWORK COMMAND state, since the RRC connections are still in use by the connections controlled by the other MM protocol 11,31,33,21.

Problems also arise during establishment of connections. During the setup of a connection, the MM protocol authenticates the terminal and controls the starting of ciphered mode communication over the air interface. For example, if a packet data connection is set up when speech connections are already in use, the communication over the air interface is already ciphered, wherefore no ciphering is started for the new packet connection. However, since the reception of a ciphering mode command by the MS is interpreted as an indication of a succesfully performed set up of a MM level connection, the MM entity 13 in the MS 10 does not receive any indication of the setting up of the MM level connection.

SUMMARY OF THE INVENTION

An object of the invention is to realize a method for controlling connections, which avoids the previously mentioned problems of prior art. Another object of the invention is to realize a method for controlling connections, which allows the use of implicit meanings of RRC level events in the control of MM level events.

The objects are reached by realizing a method, in which it is checked, if more than one MM protocols are active. If only one MM protocol is active, RRC level events can be used to control MM level events. If more than one MM protocol is active, explicit signalling is used for those MM level events, which would in the case of a single MM protocol be implicitly controlled by RRC level events.

The method for establishing a connection according to the invention is characterized by that, which is specified in the characterizing part of the independent method claim directed to establishing a connection. The method for releasing a connection according to the invention is characterized by that, which is specified in the characterizing part of the independent method claim directed to releasing a connection. The dependent claims describe further advantageous embodiments of the invention.

According to the invention, during setting up of a new MM connection it is checked whether a RRC connection is already active. If a RRC connection is already active, explicit signalling is used. Otherwise, RRC level events can be used to implicitly control MM level events. During releasing of MM connections, it is checked if another MM protocol uses RRC connections, and if that is the case, the releasing of MM connections is signalled explicitly.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
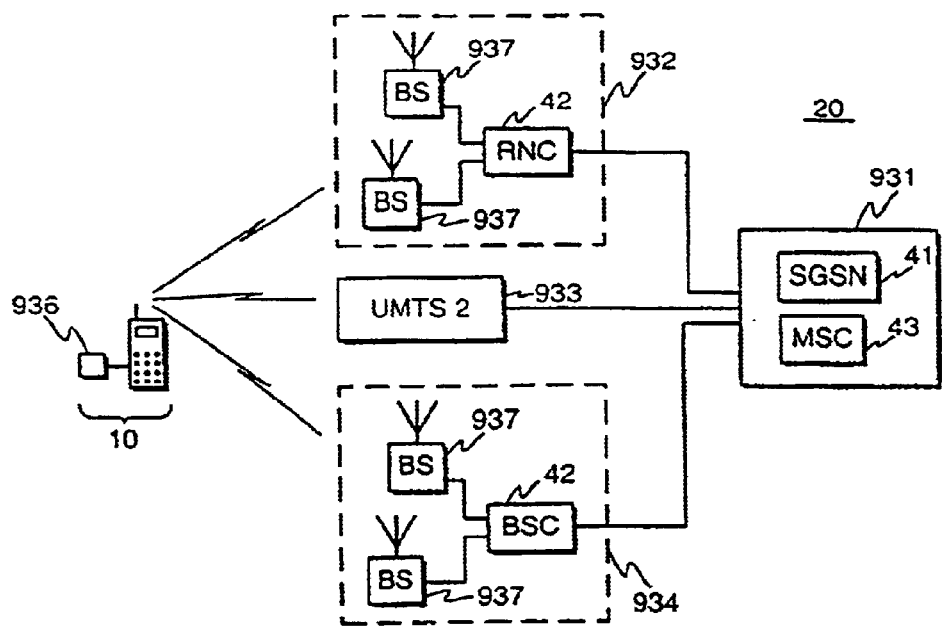
FIG. 1 illustrates an example of the structure of the UMTS system.
Figure 2:
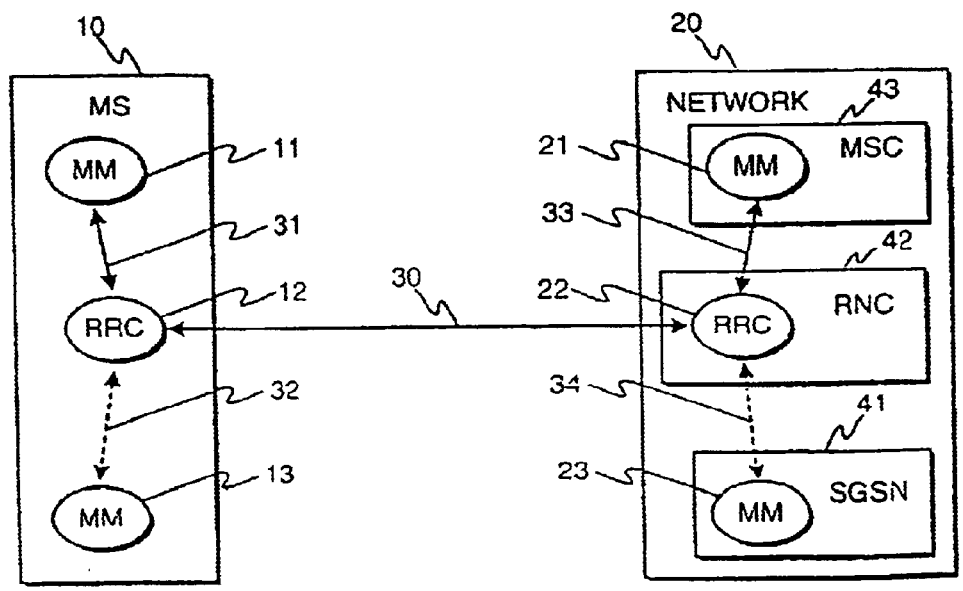
FIG. 2 illustrates various protocol entities in a mobile communication means and in the network.
Figure 3:
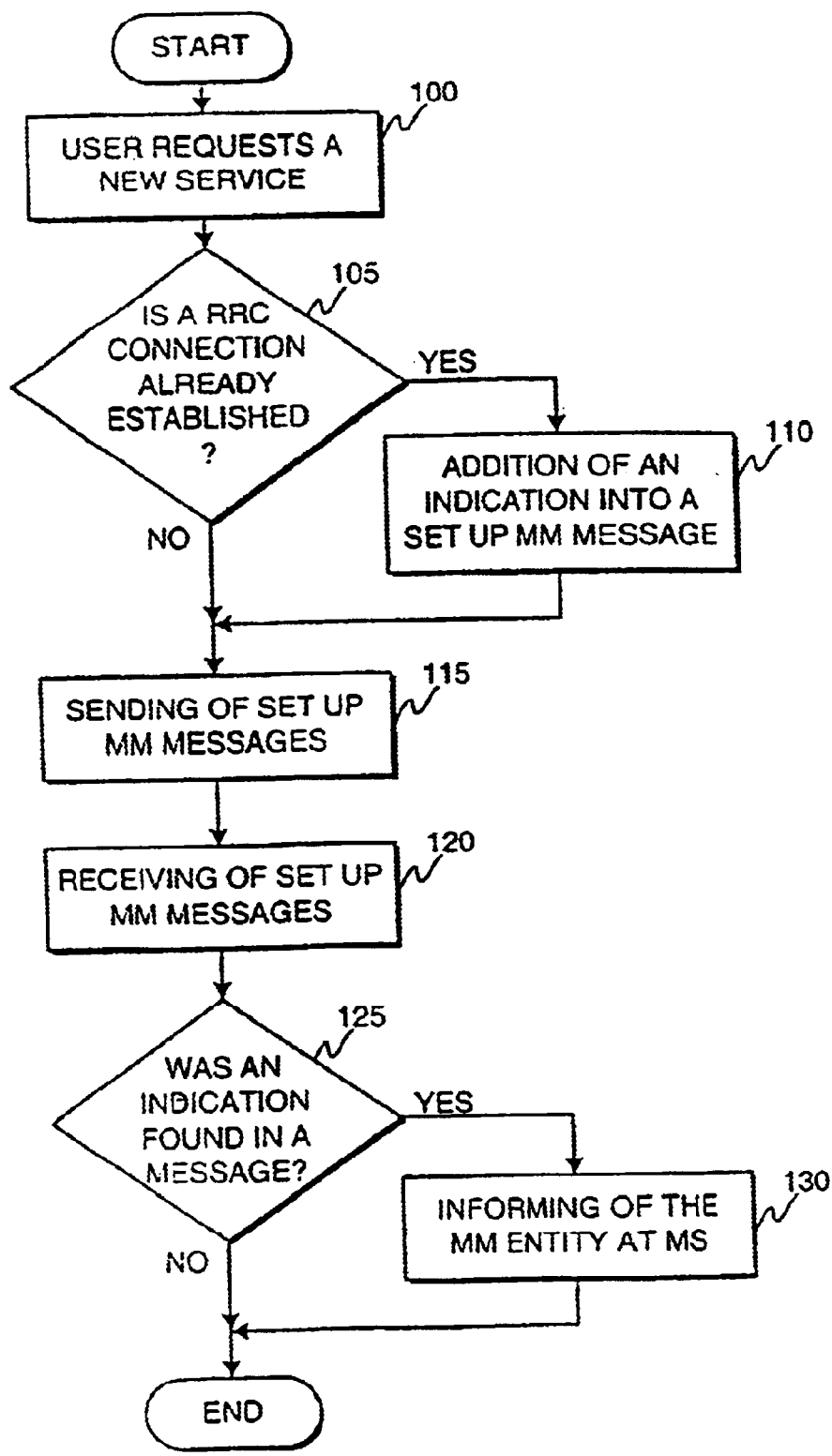
FIG. 3 illustrates a method according to an advantageous embodiment of the invention.

FIG. 3 illustrates a method according to an advantageous embodiment of the invention. FIG. 3 illustrates events during setting up of a connection. In the beginning, the set up procedure is started by e.g. the user of a mobile station, who requests 100 a new service. This new service could be, for example, a packet data connection for browsing the Internet, in which case the MM entity taking care of the setting up of the MM connection on the MS side is the packet data controlling MM entity of the MS. In the next step 105, the MM entity of the mobile station controlling the requested service checks, whether a RRC level connection is already established. If no RRC level connection is established at this point, the MM connection is the first MM connection, and can be established in the normal way continuing at step 115. If a RRC level connection is already established, the new MM connection to be set up is the second MM connection at that time. Consequently, the MM entity includes an indication of the existence of the RRC connection into the MM setup information to be sent to the network. For example, this could be realized by adding a new parameter into one of the setup messages. In the next step 115, the MM entity of the MS sends the needed MM setup information messages to the network, which messages are received by the corresponding MM entity at the network side at step 120. The MM entity at the network side checks in step 125, if an indication of the existence of a RRC connection is included in the received MM messages. If no such indication is found, the setting up of the connection continues normally. If such an indication is found, the MM entity at the network side informs 130 corresponding MM entity in the MS about those events, which in the case of only one MM protocol being used would be implicitly signalled by RRC level events. For example, such an event could be the succesful establishment of the MM level connection. The step of informing 130 could in such a case be an explicit acknowledgment of the establishment of the MM connection, for example by sending a CM SERVICE ACCEPT message. The step of informing may take place at a later point during the setting up of the MM connection or for example after the setting up of the connection.

Figure 4:
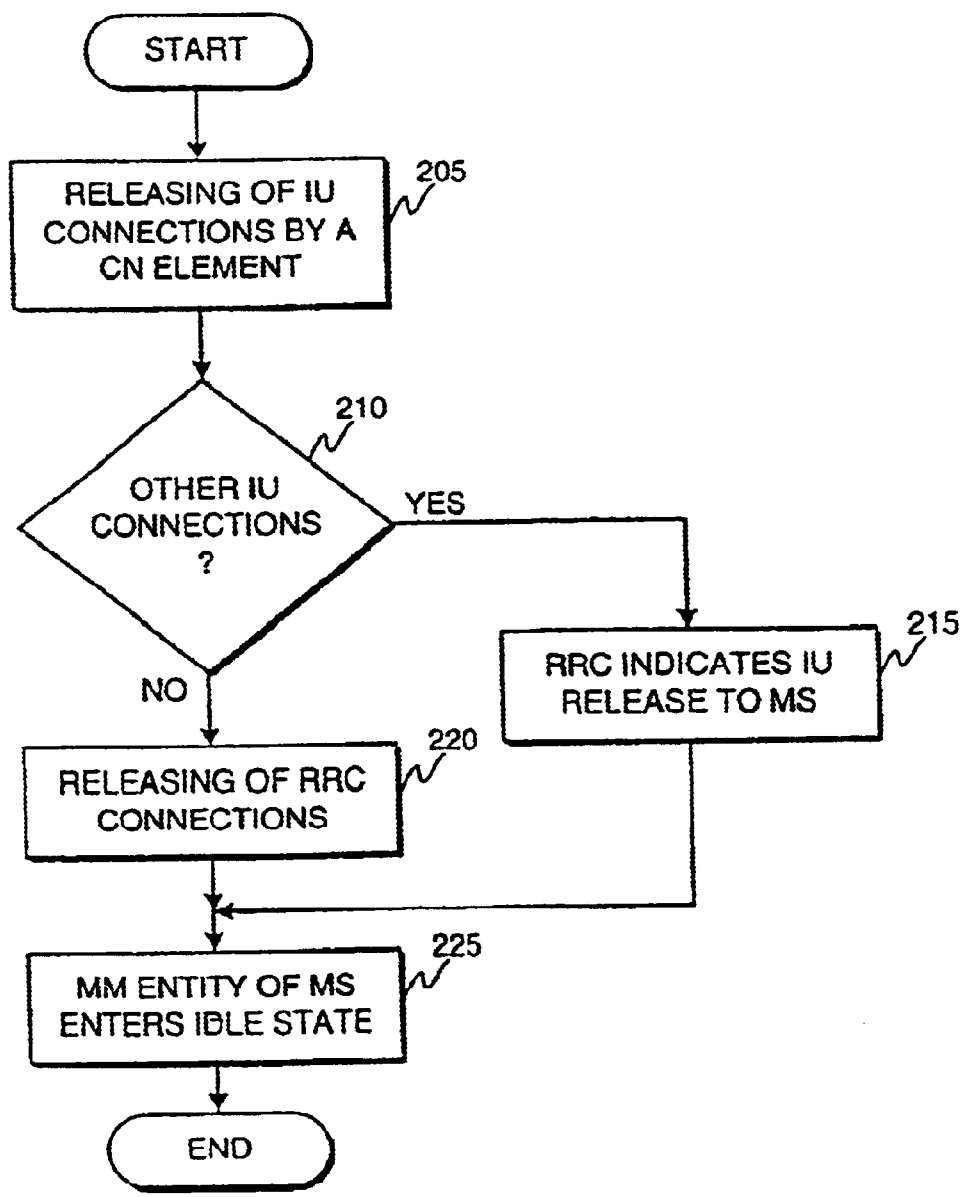
FIG. 4 illustrates another example of a method according to an advantageous embodiment of the invention.

FIG. 4 illustrates another example of a method according to an advantageous embodiment of the invention. This example shows events during releasing of a connection. Such events could take place, for example, when connections between a mobile station and a CN element are released. In the first step 205, a core network element releases the connections between itself and the RNC, i.e. the Iu interface connections. In the next step 210, the RRC protocol control entity in the RNC checks, if any other Iu connections to another CN element remain. If Iu connections to other CN elements remains, there is at least one other MM protocol active, in which case the RRC entity in the RNC indicates 215 to the MS, that the released Iu connections were released. The informing may be realized for example by sending a specific message to the MS, such as for example a RRC status message. The receiving of the message indicates to the MM entity of the MS that it can enter 225 the IDLE state. If no other Iu connections were found to remain at step 210, in which case there was only one active MM protocol, the RRC entity releases RRC connections in step 220, which implicitly indicates to the MM entity of the MS that it can enter 225 the IDLE state.

Figure 5:
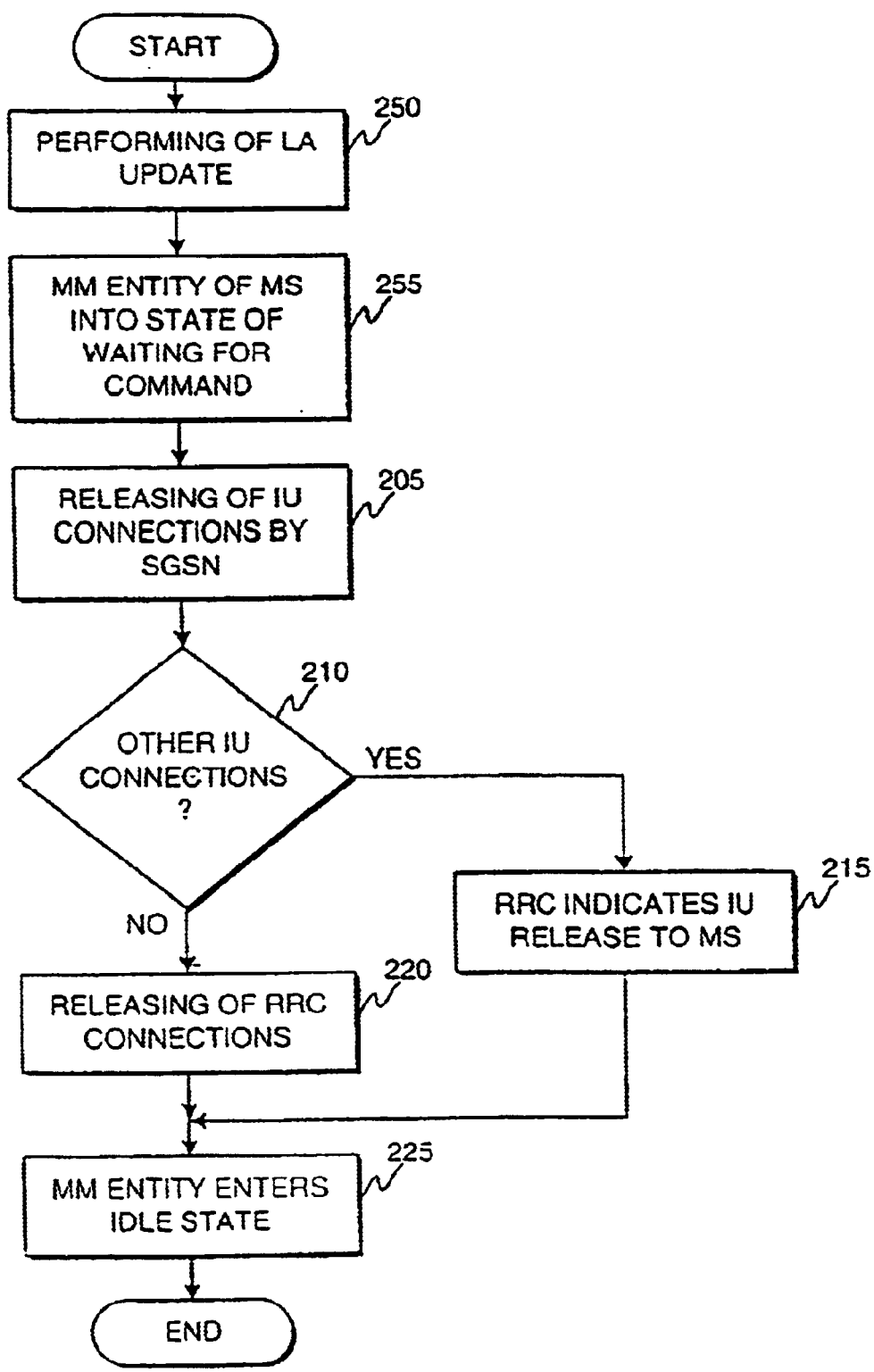
FIG. 5 illustrates a still further example of a method according to an advantageous embodiment of the invention.

FIG. 5 illustrates a still further example of a method according to an advantageous embodiment of the invention. In this example, the MS has active connections to one CN element, for example speech connections to a MSC, during which the MS performs a location area (LA) update to an idle MM entity, such as the MM entity of a SGSN. In step 250, the MS performs the location area update, during which among other procedural steps, an Iu connection is created between the RNC and the SGSN. After the LA update is performed, the packet connection MM entity enters 255 the WAITING FOR NETWORK COMMAND state, from which according to prior art it should enter the IDLE state as a response to releasing of RRC connections. In the next step 205, the SGSN releases the connections between itself and the RNC, i.e. the Iu interface connections. In the next step 210, the RRC protocol control entity in the RNC checks, if any other Iu connections to another CN element remain. If Iu connections to other CN elements remain, there is at least one other MM protocol active, in which case the RRC entity in the RNC indicates 215 to the MS, that the released Iu connections were released. The informing may be realized for example by sending a specific message to the MS. The receiving of the message indicates to the MM entity of the MS that it can enter 225 the IDLE state. If no other Iu connections were found to remain at step 210, in which case only one active MM protocol, the RRC entity releases RRC connections in step 220, which implicitly indicates to the MM entity of the MS that it can enter 225 the IDLE state.

In a further advantageous example, a method substantially similar to that illustrated in FIG. 5 is used with a DETACH procedure.

The invention clarifies the use of the single radio signalling bearer, i.e. the RRC connection in cases, where more than one separate MM protocols are executed. The invention allows the use of RRC level events for implicitly giving signals to the MM level even in the case of more than one separate MM protocols being used. Therefore, even the present GSM mobile stations which support the use of only one MM protocol are able to communicate with a GSM-type radio access network of the UMTS system in the conventional way, even though the radio access network supports the simultaneous use of speech and packet data services, and consequently the use of two MM protocols.

Although in the previous examples the setting up and releasing of connections were described separately in separate examples, the invention is not limited to those examples. In some embodiments of the invention, signalling according to the invention is used in both setting up and releasing of a connection. For example, a packet data connection can be set up, used, and released while speech connections are active. In such an embodiment, signalling methods according to the invention can be used in the setting up and in the releasing of the packet data connection.

In view of the foregoing description it will be evident to a person skilled in the art that various modifications may be made within the scope of the invention. While a preferred embodiment of the invention has been described in detail, it should be apparent that many modifications and variations thereto are possible.

What is claimed is:

1. A method for establishing a mobility management protocol connection in a cellular telecommunications network, characterized in that the method comprises steps, in which it is checked, if a Radio Resource Control RRC connection is already established, and if a RRC connection is already established, an indication of that is added to mobility management connection set up information, and if no RRC connection is already established, establishment of the mobility management protocol connection is continued normally.

2. A method according to claim 1, characterized in that if said indication is added, the completion of mobility management connection establishment is signalled explicitly.

3. A method according to claim 2, characterized in that said explicit signalling comprises the step of sending a CM SERVICE ACCEPT message.

4. A method for releasing a mobility management protocol connection in a cellular telecommunications network, characterized in that the method comprises steps, in which an Iu connection is released between a core network element and a radio network controller, after which it is checked, if at least one other Iu connection is still active, and if at least one other Iu connection is still active, said releasing of an Iu connection is indicated explicitly, and if no other Iu connection remains active, release of the mobility management protocol connection is continued normally.

5. A method according to claim 4, characterized in that said step of indicating said releasing explicitly comprises sending of a message from said radio network controller to a mobile station.

6. A method according to claim 4, characterized in that said explicit indicating comprises the step of sending a RRC status message.

* * * * *